No. 751,210.

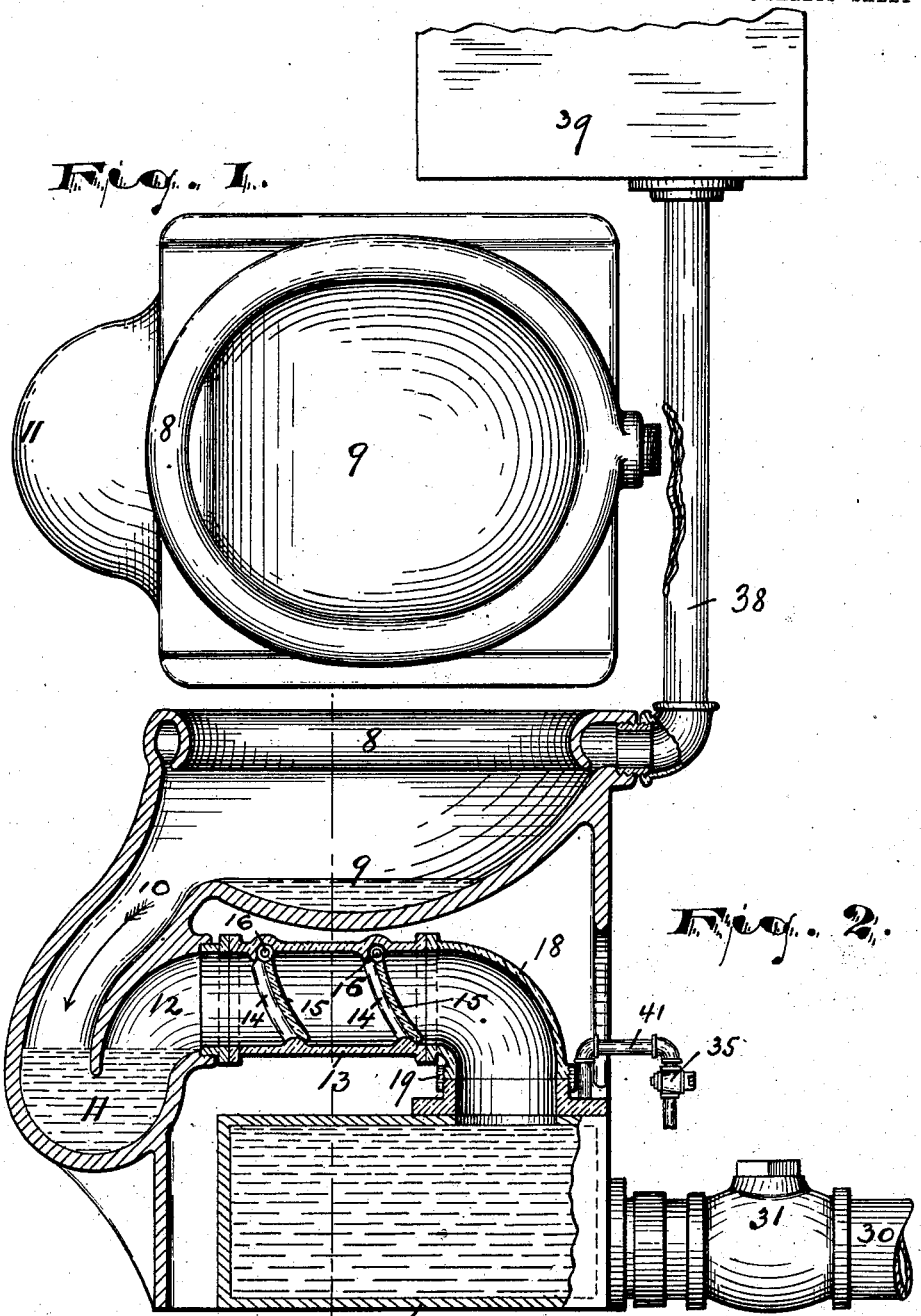

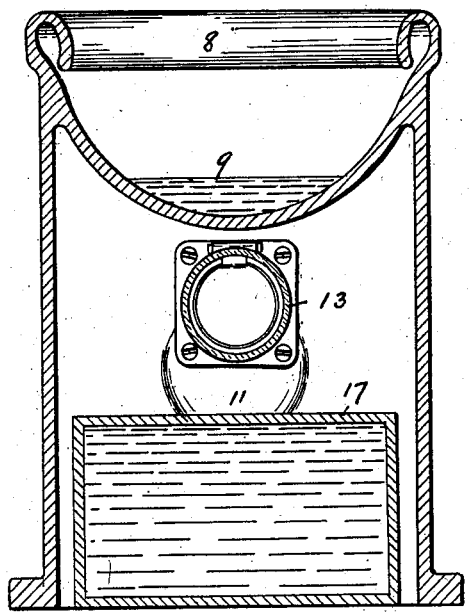
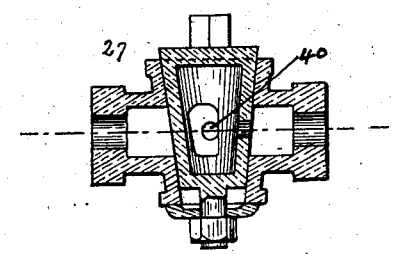
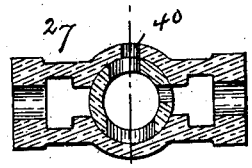
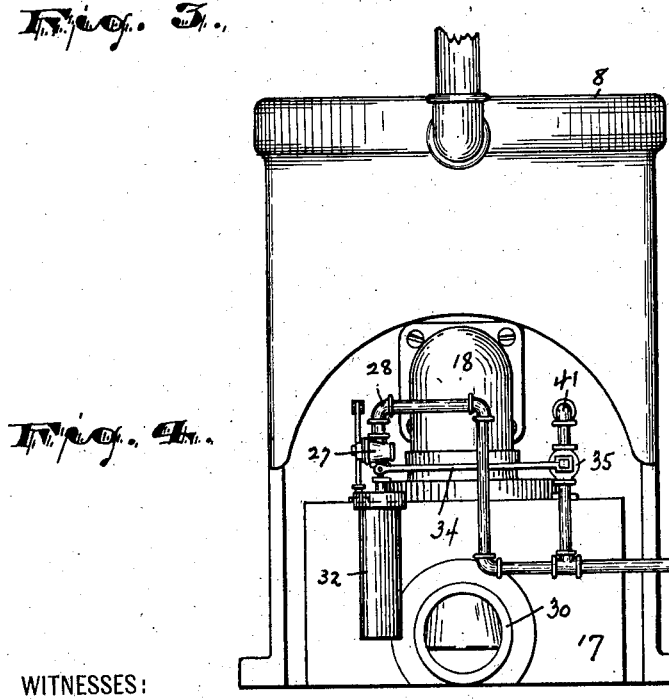

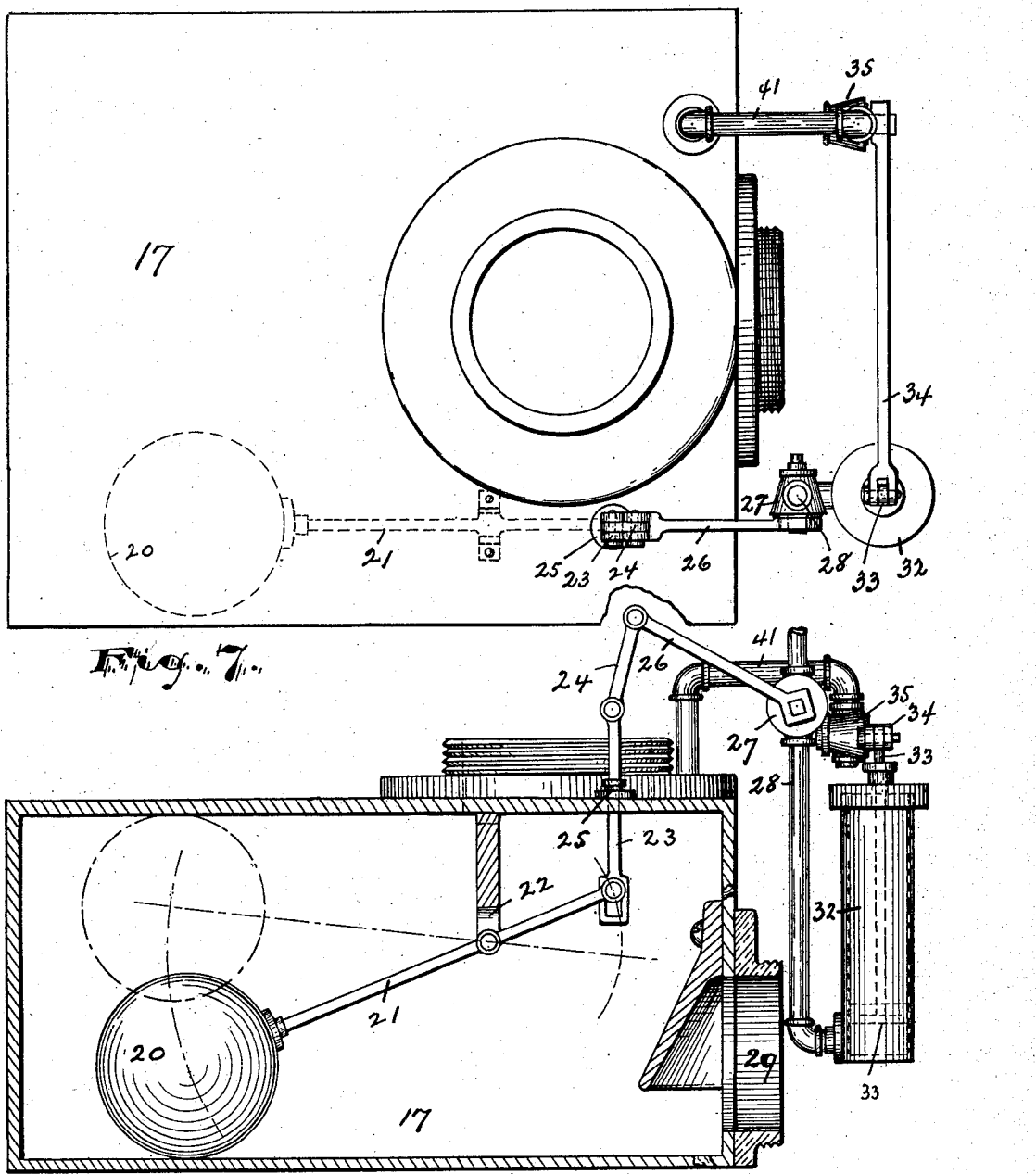

Patented February 2, 1904.

UNITED STATES PATENT OFFICE.

WILLIAM H. SMITH, OF ELIZABETH, NEW JERSEY, ASSIGNOR OF ONE-HALF TO WALTER F. KELLY, OF ELIZABETH, NEW JERSEY.

AUTOMATIC MARINE WATER-CLOSET.

SPECIFICATION forming part of Letters Patent No. 751,210, dated February 2, 1904.

Application filed April 13, 1903. Serial No. 152,379. (No model.)

*To all whom it may concern:*

Be it known that I, WILLIAM H. SMITH, a citizen of the United States, residing at Elizabeth, in the county of Union and State of New Jersey, have invented and produced a new and original Improvement in Automatic Marine Water-Closets; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to enable marine water-closets or water-closets employed in boats or floating vessels, and particularly the closets which are stationed in the vessel below the surface level of the surrounding water, to be flushed with greater convenience and ease, to avoid the labor and inconvenience of hand-pumping in the operation of forcing the water containing the excrementitous matter out into the open sea or surrounding water, to provide a more simple and durable structure, and to reduce the cost of construction, and to secure other advantages and results, some of which may be referred to hereinafter in connection with the detailed description of the working parts.

The invention consists in the improved marine water-closet, in the means employed for automatically supplying compressed air thereto, and in the arrangements and combinations of parts of the same, all substantially as will be hereinafter set forth, and finally embraced in the clauses of the claim.

Referring to the accompanying drawings, in which like numerals of reference indicate corresponding parts in each of the several figures, Figure 1 is a plan of the seat and bowl portion of my improved device. Fig. 2 is a vertical section of the same, showing it in connection with an intermediate tank, the usual flushing-tank, an out-passage pipe adapted to lead the flushed matter from the bowl and also showing certain of the compressed-air connections. Fig. 3 is a section taken on line *x* of Fig. 2. Fig. 4 shows in rear elevation the intermediate tank or reservoir in connection with the said bowl and compressed-air connections. Figs. 5 and 6 are sectional views of a certain valve hereinafter more fully referred to. Fig. 7 is a detail plan of the intermediate tank or reservoir and certain of the connections, and Fig. 8 is a longitudinal view of the said intermediate tank or reservoir and connections.

In said drawings, 8 indicates the water-closet seat, beneath which are the bowl 9 and down-flow-passage 10 to the trap 11. To the inner extension 12 of the trap is attached a tubular connection 13, having seats 14 14 for a plurality of check or swinging gate valves 15 15, suspended from pivots 16 at the upper side of said connection 13 and arranged and adapted to open under the pressure of fluid flowing down from the bowl and to automatically close by gravity against their respective seats and be held in impervious relation to said seats under pressure of compressed air in a certain intermediate reservoir 17, arranged beneath said bowl 9, as shown clearly in Fig. 2. Said valved extension 13 is preferably connected to the top of the receptacle 17 by an elbow 18 and a threaded collar 19, the elbow and the reservoir being suitably threaded to receive said parts and form an impervious joint.

The interior of the reservoir 17 is of a size sufficient to receive a float 20, Fig. 8, and lever 21, fulcrumed on a suitable bearing 22 in said reservoir, and to permit an operation of the same under the power of the rising and falling fluid in said reservoir. The said lever 21 is in connection with connecting-rods 23 and 24, the first extending through a packing-box 25 in the top or other portion of the reservoir, as convenience may dictate, and the second pivoted to the first and to a lever 26 for operating a valve 27 in a compressed-air pipe 28.

At or near the bottom of the reservoir 17 is an exit-opening 29, Fig. 8, at which the out-passage pipe 30, Fig. 2, is imperviously connected, so as to prevent leakage at the joint, the said out-passage pipe 30 being preferably provided with a suitable check-valve 31, Fig. 2, the interior of which is similar to the construction shown at 14 15 in Fig. 2, by which backflow or inflow from the water surrounding the boat or vessel is prevented.

The air-pipe 28 having been opened by the valve 27, the compressed air received from a suitable reservoir or air-compressor (not shown) is conducted to the cylinder 32. The piston 33 in said cylinder 32 is forced upward to operate the lever 34 of a second valve 35, with which it is connected, turning said valve 35, so that there is an open communication from the compressed-air reservoir, (not shown,) as before stated, directly through the branch pipe 41 of the compressed-air pipe 28 into the tank or reservoir 17. Upon the entrance of the compressed air into the reservoir 17 the pressure thereof tends to more imperviously and perfectly close the valves 15 to force the liquid contents of the said reservoir 17 outward through the outflow passage or pipe 30, thus lowering the level of the water in said reservoir, so that the float 20 is lowered to the position shown in Fig. 8 to close the valve 27. The said reservoir 17 is maintained in its empty condition, so far as water is concerned, until the pipe 38 from the flushing-tank 39 is opened by the usual means to permit the gravitation of the liquid contents therein and flushed, as hereinbefore described. The valve 27 is a three-way valve, as indicated in Figs. 5 and 6, so that when communication from the compressed-air reservoir through the compressed-air pipe 28 is closed at the same time a vent-passage 40 in the said valve 27 is opened to permit the escape of air beneath the piston in the cylinder 32, so that the said piston is allowed to gravitate to its position as shown in Fig. 8, gravitation of the said piston again closing the valve 35 in the compressed-air pipe. It will thus be noticed that compressed air is supplied to the reservoir containing the flushings from the bowl automatically, so that the liquid contents of the tank 17 is forced out through pipe 30 into the surrounding water and hand-labor in pumping, as sometimes heretofore performed, is avoided.

Having thus described the invention, what I claim as new is—

1. The combination with the bowl, a flushing-tank and connections, of a reservoir adapted to receive the flushings from the bowl, said reservoir containing a float in connection with a valve of a compressed-air pipe, and said compressed-air pipe having said valve, substantially as set forth.

2. The combination with the bowl, flushing-tank and connections, of a reservoir arranged in connection with said bowl to receive the flushing-water therefrom, a float in said reservoir, a valved compressed-air pipe, the valve of which is operated by said float to permit an inflow of compressed air into the said reservoir, substantially as set forth.

3. The combination with the bowl, flushing-tank and connections, of a reservoir arranged in connection with said bowl to receive the flushing-water therefrom, a float in said reservoir, a valved compressed-air pipe, the valve of which is operated by said float to permit an inflow of compressed air into the reservoir, and an out-passage pipe from said reservoir having a valve to prevent backflow, substantially as set forth.

4. The combination with the bowl, flushing-tank and connecting-pipe, of a reservoir arranged below the said bowl in trapped connection with the same, the connections being provided with check-valves, a float in said reservoir in connection with a valve of a compressed-air pipe, said compressed-air pipe having said valve, a cylinder 32, in connection with said pipe, a piston in said cylinder and connections of said piston with a second valve governing the flow of the compressed air through the compressed-air pipe into the said reservoir, substantially as set forth.

5. The combination with the bowl, flushing-tank, reservoir and connections, of a cylinder and branched compressed-air pipe leading the air into said reservoir and cylinder, the branches of the pipe each being provided with valves, and a float and connections controlling said valves, substantially as set forth.

6. The combination with the bowl, flushing-tank and reservoir and connections, of a cylinder and compressed-air pipe leading the air into said reservoir and cylinder, the branches of the pipe each being provided with valves and a float arranged in said reservoir, connecting-rods 23, and 24, and lever 26, connecting with valve 27, a piston arranged in said cylinder and a lever connecting said piston with the valve 27, substantially as set forth.

7. In a water-closet, the combination with a reservoir adapted to receive the flushing-water, of a float adapted to be raised by the flushing-water to open a compressed-air valve, a compressed-air pipe having said valve and means controlling a second valve whereby said means are operated by the compressed air entering through the first said valve said operating means will open said second valve, and said second valve controlling the flow of compressed air into said reservoir, substantially as set forth.

In testimony that I claim the foregoing I have hereunto set my hand this 27th day of March, 1903.

WILLIAM H. SMITH.

Witnesses:
CHARLES H. PELL,
C. B. PITNEY.